(12) United States Patent
Uchibori et al.

(10) Patent No.: US 10,189,439 B2
(45) Date of Patent: Jan. 29, 2019

(54) SEAT BELT RETRACTOR AND SEAT BELT DEVICE

(71) Applicant: JOYSON SAFETY SYSTEMS JAPAN K.K., Tokyo (JP)

(72) Inventors: Hayato Uchibori, Tokyo (JP); Daichi Nemoto, Tokyo (JP)

(73) Assignee: JOYSOFT SAFETY SYSTEMS JAPAN K.K., Tokyo (JP)

( * ) Notice: Subject to any disclaimer, the term of this patent is extended or adjusted under 35 U.S.C. 154(b) by 123 days.

(21) Appl. No.: 15/321,927

(22) PCT Filed: Jun. 23, 2015

(86) PCT No.: PCT/JP2015/067959
§ 371 (c)(1),
(2) Date: Dec. 23, 2016

(87) PCT Pub. No.: WO2015/199050
PCT Pub. Date: Dec. 30, 2015

(65) Prior Publication Data
US 2017/0129452 A1 May 11, 2017

(30) Foreign Application Priority Data
Jun. 27, 2014 (JP) .................. 2014-132541

(51) Int. Cl.
*B60R 22/28* (2006.01)
*B60R 22/34* (2006.01)
(Continued)

(52) U.S. Cl.
CPC ...... *B60R 22/3413* (2013.01); *B60R 22/1855* (2013.01); *B60R 22/1954* (2013.01);
(Continued)

(58) Field of Classification Search
CPC ......... B60R 22/26; B60R 22/28; B60R 22/36; B60R 22/1855; B60R 22/1954; B60R 22/3413
See application file for complete search history.

(56) References Cited

U.S. PATENT DOCUMENTS 6,216,972 B1 * 4/2001 Rohrle ................ B60R 22/3413
242/379.1
6,250,684 B1 * 6/2001 Gleason .................. B60R 22/24
24/197
(Continued)

FOREIGN PATENT DOCUMENTS

DE     10 2009 010 435 A1     9/2010
DE     10 2008 049 931 B4     3/2012
(Continued)

OTHER PUBLICATIONS

European Search Report dated Nov. 28, 2017 in corresponding application No. 15811161.
(Continued)

Primary Examiner — Sang K Kim
(74) Attorney, Agent, or Firm — Foley & Lardner LLP (57) ABSTRACT

Provided are a seat belt retractor and a seat belt device with which it is possible to improve energy absorption characteristics and a restraining property. The seat belt retractor includes a spool that performs winding of a webbing for restraining an occupant, a shaft inserted through an axial center of the spool, and a locking base connected to the shaft and capable of switching between a rotating state and a non-rotating state. The seat belt retractor further includes a load adjustment member disposed between the shaft and the locking base and that blocks or reduces load transmission in a case where a load equal to or greater than a threshold is applied to the shaft, and an energy absorption device disposed between the spool and the locking base and capable of (Continued)

changing an energy absorption amount according to a relative rotation speed between the spool and the locking base. The energy absorption device is connected in parallel with the load adjustment member.

5 Claims, 8 Drawing Sheets

(51) Int. Cl.
*B60R 22/36* (2006.01)
*B60R 22/185* (2006.01)
*B60R 22/195* (2006.01)
*B60R 22/26* (2006.01)
*B60R 22/18* (2006.01)

(52) U.S. Cl.
CPC .............. *B60R 22/26* (2013.01); *B60R 22/28* (2013.01); *B60R 22/36* (2013.01); *B60R 2022/1806* (2013.01); *B60R 2022/287* (2013.01)

(56) References Cited

U.S. PATENT DOCUMENTS

| | | | |
|---|---|---|---|
| 6,416,008 B1* | 7/2002 | Fujii | B60R 22/4676 |
| | | | 242/379.1 |
| 7,232,089 B2* | 6/2007 | Inagawa | B60R 22/3413 |
| | | | 242/379.1 |
| 8,262,059 B2 | 9/2012 | Dolenti et al. | |
| 8,473,162 B2 | 6/2013 | Jabusch | |
| 8,523,140 B2 | 9/2013 | Dolenti et al. | |
| 8,529,398 B2 | 9/2013 | Jabusch | |
| 9,242,617 B2 | 1/2016 | Singer et al. | |
| 9,327,681 B2 | 5/2016 | Singer et al. | |
| 2003/0132334 A1 | 7/2003 | Koning et al. | |
| 2005/0133330 A1 | 6/2005 | Stiefvater | |
| 2006/0011764 A1 | 1/2006 | Inagawa et al. | |
| 2011/0172054 A1 | 7/2011 | Jabusch | |
| 2013/0140391 A1 | 6/2013 | Jabusch | |
| 2015/0203070 A1 | 7/2015 | Singer et al. | |

FOREIGN PATENT DOCUMENTS

| | | |
|---|---|---|
| DE | 10 2011 008 405 A1 | 7/2012 |
| DE | 10 2011 101 481 A1 | 11/2012 |
| DE | 10 2011 101 517 A1 | 11/2012 |
| DE | 10 2011 101 518 A1 | 11/2012 |
| DE | 10 2011 114 572 A1 | 4/2013 |
| DE | 10 2011 101 516 B4 | 7/2013 |
| DE | 10 2012 010 918 A1 | 12/2013 |
| DE | 10 2010 026 285 B4 | 2/2014 |
| DE | 10 2010 050 189 B4 | 3/2014 |
| DE | 10 2012 214 521 B4 | 3/2014 |
| DE | 10 2013 001 375 A1 | 7/2014 |
| DE | 10 2011 089 203 B4 | 8/2014 |
| DE | 10 2011 101 515 B4 | 8/2014 |
| DE | 10 2013 203 286 A1 | 8/2014 |
| DE | 10 2014 202 498 B3 | 3/2015 |
| DE | 10 2013 220 949 A1 | 4/2015 |
| EP | 1 874 593 B1 | 12/2010 |
| JP | 2001-287621 A | 10/2001 |
| JP | 2002-178877 A | 6/2002 |
| JP | 2006-159982 A | 6/2006 |
| JP | 2009-113551 A | 5/2009 |
| JP | 2010-089528 A | 4/2010 |
| JP | 2012-030636 A | 2/2012 |
| JP | 2013-184538 A | 9/2013 |
| JP | 2014-502576 A | 2/2014 |
| JP | 2015-128925 A | 7/2015 |
| WO | WO-2004/096611 A1 | 11/2004 |
| WO | WO-2007/130041 A1 | 11/2007 |
| WO | WO-2010/139433 A1 | 12/2010 |
| WO | WO-2012/014380 A1 | 2/2012 |
| WO | WO-2012/059166 A1 | 5/2012 |
| WO | WO-2012/156019 A1 | 11/2012 |
| WO | WO-2012/156020 A1 | 11/2012 |
| WO | WO-2013/079150 A1 | 6/2013 |
| WO | WO-2014/010487 A1 | 1/2014 |
| WO | WO-2014/131824 A1 | 9/2014 |
| WO | WO-2015/055570 A1 | 4/2015 |
| WO | WO-2015/121159 A1 | 8/2015 |

OTHER PUBLICATIONS

International Search Report issued in International Patent Application No. PCT/JP2015/067959 dated Sep. 8, 2015.

* cited by examiner

SEAT BELT RETRACTOR AND SEAT BELT DEVICE

CROSS-REFERENCE TO RELATED APPLICATIONS

The present application is a U.S. national stage application of International Patent Application No. PCT/JP2015/067959, filed Jun. 23, 2015, which claims the benefit of priority to Japanese Patent Application No. 2014-132541, filed Jun. 27, 2014, the entireties of which are hereby incorporated by reference.

TECHNICAL FIELD

The present invention relates to a seat belt retractor and a seat belt device, and more specifically, to a seat belt retractor suitable for improving energy absorption characteristics and a seat belt device provided with the seat belt retractor.

BACKGROUND ART

For example, in a winding device of a long object having a belt shape or a string shape (including a rewinding function), a winding barrel (also referred to as a drum or a spool) around which the long object is wound performs a rotary motion relative to a supporting unit rotatably supporting the winding barrel. In the device that performs such relative rotary motion, in a case where the long object is fully extended or where the winding barrel is stopped during winding or rewinding, a large load is applied to the device and to the long object, whereby it is preferred that an energy absorption device be disposed between objects that are performing the relative rotary motion. A representative example of such winding device is a seat belt retractor used in a seat belt device (see, for example, Patent Literature 1 or 2).

Patent Literature 1 discloses a seat belt retractor having a torsion bar and a wire disposed between a winding drum and a ratchet gear, which rotate relative to each other. By using such seat belt retractor, it is possible to absorb energy that may be generated between the winding drum and the ratchet gear by torsional deformation of the torsion bar and sliding deformation of the wire, and it is also possible to change energy absorption characteristics by varying a drawing load required for causing the sliding deformation of the wire.

Patent Literature 2 discloses a force-limiting device for a motor vehicle having ring disks (1 and 3) and an oscillating part (2) disposed between objects rotating relative to each other. By using such device, when the oscillating part (2) rotates relative to the ring disks (1 and 3), a protrusion (5) formed in the oscillating part (2) alternately contacts protrusions (7 and 8) formed in the ring disks (1 and 3) while oscillating, whereby it is possible to absorb energy generated between the objects rotating relative to each other. More specifically, in this device, kinetic energy changes with a rotation speed of the oscillating part (2), whereby it is possible to increase an energy absorption amount as the rotation speed of the oscillating part (2) increases.

CITATION LIST

Patent Literature

Patent Literature 1: JP 2013-184538 A
Patent Literature 2: JP 2014-502576 A

SUMMARY OF INVENTION

Technical Problem

In the seat belt device having the seat belt retractor provided with the energy absorption device as described above in Patent Literatures 1 and 2, occupants of various physical constitutions such as a male, a female, a large person, and a small person may sit on a seat of the same vehicle. Thus, depending on an occupant, a load applied to a webbing and a retractor at a time of a vehicle crash may vary for the same seat belt device. To deal with this varying load, it is necessary to dispose, to a vehicle, a sensor for determining the physical constitution of the occupant or an energy absorption device capable of handling different loads.

With the energy absorption device described in Patent Literature 1, however, it is possible to change the energy absorption characteristic in two steps by the wire and the torsion bar, but it is not possible to change the energy absorption characteristic steplessly.

In general, at an initial stage of the vehicle crash, it is preferred that the occupant be restrained by suppressing the webbing from being drawn out; however, with the energy absorption device described in Patent Literature 2, although it is possible to change an energy absorption amount according to a rotation speed of the oscillating part as well as to deal with the occupants each having the different physical constitution, the energy absorption device may function at the initial stage of the vehicle crash as well, and the webbing may be drawn out.

The present invention has been made in view of such problem, and an objective thereof is to provide a seat belt retractor and a seat belt device with which it is possible to improve the energy absorption characteristics and a restraining property.

Solution to Problem

According to the present invention, there is provided a seat belt retractor including a spool that performs winding of a webbing for restraining an occupant, a shaft inserted through an axial center of the spool, and a locking base connected to the shaft and capable of switching between a rotating state and a non-rotating state. The seat belt retractor further includes a load adjustment member disposed between the shaft and the locking base and that blocks or reduces load transmission in a case where a load equal to or greater than a threshold is applied to the shaft, and an energy absorption device disposed between the spool and the locking base and capable of changing an energy absorption amount according to a relative rotation speed between the spool and the locking base. The energy absorption device is connected in parallel with the load adjustment member.

According to the present invention, there is provided a seat belt device including a webbing for restraining an occupant to a seat, a seat belt retractor that performs winding of the webbing, a belt anchor that fixes the webbing to a vehicle body side, a buckle disposed to a lateral face of the seat, and a tongue disposed to the webbing. The seat belt retractor is provided with a spool that performs winding of the webbing, a shaft inserted through an axial center of the spool, and a locking base connected to the shaft and capable of switching between a rotating state and a non-rotating state. The seat belt retractor further includes a load adjustment member disposed between the shaft and the locking base and that blocks or reduces load transmission in a case where a load equal to or greater than a threshold is applied to the shaft, and an energy absorption device disposed between the spool and the locking base and capable of changing an energy absorption amount according to a relative rotation speed between the spool and the locking base. The energy absorption device is connected in parallel with the load adjustment member.

In the seat belt retractor and the seat belt device, the energy absorption device may include a housing coaxially disposed on a spool side, a clutch plate coaxially disposed on a locking base side, and a drag generation member housed inside the housing and that generates drag according to a relative rotation speed between the housing and the clutch plate.

The housing may have a pair of facing planes facing a front surface and a back surface of the clutch plate. Annular corrugated grooves may be formed on the pair of facing planes such that projections and recesses thereof are synchronous with each other. The drag generation member may include a plurality of driving pins having both ends thereof inserted into the corrugated grooves. The clutch plate may have a plurality of openings through which the plurality of driving pins is inserted so as to be capable of moving along the corrugated grooves.

The plurality of driving pins may include a cylindrically-shaped first driving pin that abuts on the opening by relative rotation of the clutch plate to the housing, and a crescent-pillar-shaped second driving pin that moves by being pushed by the first driving pin.

The load adjustment member may be any of a load limiter, a torque limiter, a torsion bar integrally formed with the shaft, and an energy absorption member.

Advantageous Effects of Invention

With the seat belt retractor and the seat belt device according to the above-described present invention, by connecting the energy absorption device in parallel with the load adjustment member, it is possible to hold, by the load adjustment member, such that the spool and the locking base do not rotate relative to each other until the load equal to or greater than the predetermined threshold is applied to the shaft. Thus, even at the initial stage of the vehicle crash, it is possible to suppress a function of the energy absorption device by the load adjustment member as well as to restrain the occupant to the seat. In a case where the load equal to or greater than the predetermined threshold is applied to the shaft, the load adjustment member functions, and a relative rotary motion is generated between the spool and the locking base, whereby the energy absorption device functions. At this time, by using the energy absorption device capable of changing the energy absorption amount according to the relative rotation speed, it is possible to steplessly change the energy absorption characteristics as well as to perform appropriate energy absorption according to a difference in the physical constitution among the occupants. Thus, according to the present invention, it is possible to improve the energy absorption characteristics and the restraining property.

BRIEF DESCRIPTION OF DRAWINGS

FIGS. 1(A) and 1(B) are conceptual diagrams illustrating a seat belt retractor according to a first embodiment of the present invention; FIG. 1(A) is the diagram illustrating a first example, and FIG. 1(B) is the diagram illustrating a second example.

FIGS. 2(A) and 2(B) are graphs illustrating an effect of the first embodiment illustrated in FIG. 1(B); FIG. 2(A) is the graph illustrating a time course of a relative rotation speed, and FIG. 2(B) is the graph illustrating a time course of a shaft-applied load.

FIG. 3(A) is a front view, and FIG. 3(B) is a sectional view.

FIGS. 6(A) and 6(B) are views illustrating a function of the energy absorption device illustrated in FIG. 5; FIG. 6(A) is the view before relative rotation, and FIG. 6(B) is the view after the relative rotation.

DESCRIPTION OF EMBODIMENTS

Figure 1A:
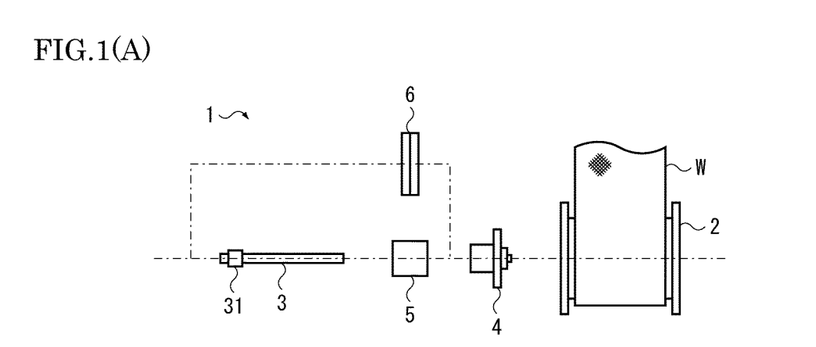
Figure 1B:
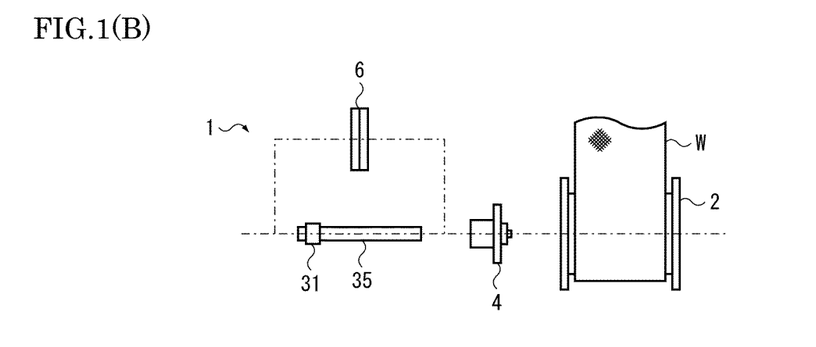
Figure 2A:
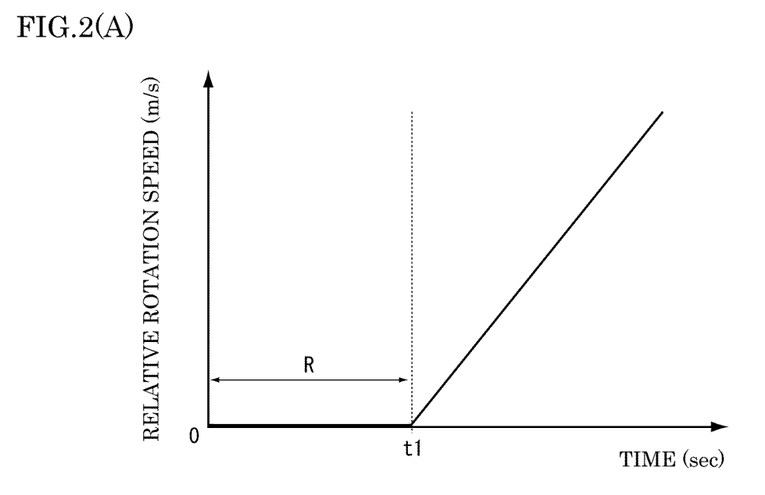
Figure 2B:
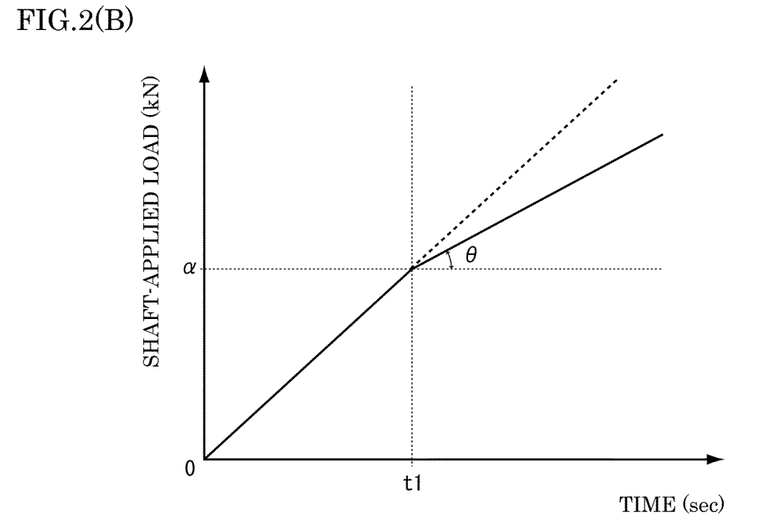

Hereinafter, embodiments of the present invention are described by using FIGS. 1(A) to 7. Here, FIGS. 1(A) and 1(B) are conceptual diagrams illustrating a seat belt retractor according to a first embodiment of the present invention; FIG. 1(A) is the diagram illustrating a first example, and FIG. 1(B) is the diagram illustrating a second example. FIGS. 2(A) and 2(B) are graphs illustrating an effect of the first embodiment illustrated in FIG. 1(B); FIG. 2(A) is the graph illustrating a time course of a relative rotation speed, and FIG. 2(B) is the graph illustrating a time course of a shaft-applied load.

As illustrated in FIG. 1(A), a seat belt retractor 1 according to the first embodiment of the present invention includes, for example, a spool 2 that performs winding of a webbing W for restraining an occupant, a shaft 3 inserted through an axial center of the spool 2, and a locking base 4 connected to the shaft 3 and capable of switching between a rotating state and a non-rotating state. The seat belt retractor 1 further includes a load adjustment member 5 disposed between the shaft 3 and the locking base 4 and that blocks or reduces load transmission in a case where a load equal to or greater than a threshold is applied to the shaft 3, and an energy absorption device 6 disposed between the spool 2 and the locking base 4 and capable of changing an energy absorption amount according to a relative rotation speed between the spool 2 and the locking base 4. The energy absorption device 6 is connected in parallel with the load adjustment member 5.

In general, the seat belt retractor 1 includes abase frame that rotatably houses the spool 2 and the shaft 3. One end of the shaft 3 is connected to one end side of the spool 2 (for example, an end portion on the left in FIG. 1(A)) through an engagement portion 31, and the other end of the shaft 3 is connected to the locking base 4. The locking base 4 is rotatably supported by the base frame, and during the normal time, it is configured to be capable of performing a rotary motion in synchronization with the shaft 3. The locking base 4 is configured to be capable of turning the shaft 3 into the non-rotating state by restricting the rotary motion in a case where sudden deceleration occurs to a vehicle or in a case where a speed of drawing the webbing W out exceeds a threshold, for example, by a restraining unit such as an acceleration sensor and a locking mechanism.

Thus, the one end of the shaft 3 always rotates in link with the spool 2 while the other end of the shaft 3 is in a rotatable state (rotating state) when the locking base 4 is in a non-restrained state and is in a non-rotatable state (non-rotating state) when the locking base 4 is in a restrained state. That is, the shaft 3 may be switched between the rotating state and the non-rotating state whether the locking base 4 is in the non-restrained state or in the restrained state.

The load adjustment member 5 is connected between the shaft 3 and the locking base 4. The load adjustment member 5 is a component that blocks or reduces the load transmission by cutting or relaxing a link between two objects in a case where an overload is caused due to the load equal to or greater than a predetermined threshold generated between the two objects. The load adjustment member 5, for example, is a load limiter or a torque limiter. As the load limiter or the torque limiter, it is possible to arbitrary select from load limiters or torque limiters of various forms available on the market for use. As illustrated in FIG. 1(B), the load adjustment member 5 may also be a torsion bar 35 integrally formed with the shaft 3. By using the torsion bar 35, it is possible to reduce the number of components. The load adjustment member 5 may also be an energy absorption member such as an energy absorption plate and energy absorption wire used in a conventional retractor. Such energy absorption member reduces the load transmission between the two objects by plastic deformation of the plate, the wire, and the like.

By disposing such load adjustment member 5, in a case where the locking base 4 is in the restrained state, that is, in a case where the shaft 3 is in the non-rotating state, even when torque (load) is transmitted from the spool 2 to the shaft 3, it is possible to hold the shaft 3 in the non-rotating state until the torque (load) reaches the threshold. Once the torque (load) transmitted from the spool 2 to the shaft 3 reaches the threshold, the load adjustment member 5 functions, and the shaft 3 rotates relative to the locking base 4.

Between the spool 2 and the locking base 4, the energy absorption device 6 is connected so as to be in parallel with the load adjustment member 5. Note that in the conceptual diagrams illustrated in FIGS. 1(A) and 1(B), "in parallel" means that a power transmission path is in parallel, and in actuality, the energy absorption device 6 is coaxially disposed with the spool 2, the shaft 3, and the locking base 4. In a case where a relative rotary motion is generated between the spool 2 and the locking base 4, the energy absorption device 6 is a component that absorbs kinetic energy generated therebetween. As described below, it is preferred that the energy absorption device 6 be capable of changing the energy absorption amount according to the relative rotation speed such that the energy absorption amount is small in a case where the relative rotation speed is slow and the energy absorption amount is large in a case where the relative rotation speed is fast.

Since the energy absorption device 6 is disposed in parallel with the load adjustment member 5, in a state where the load adjustment member 5 is not functioning, that is, in a state where the torque (load) transmitted from the spool 2 to the shaft 3 does not reach the threshold, the relative rotary motion is not generated between the spool 2 and the locking base 4, whereby the energy absorption device 6 does not function. On the other hand, in a state where the load adjustment member 5 is functioning, that is, in a state where the torque (load) transmitted from the spool 2 to the shaft 3 reaches the threshold, the shaft 3 rotates by following the spool 2, whereby the relative rotary motion is generated between the spool 2 and the locking base 4, and the energy absorption device 6 functions.

Here, an effect of the seat belt retractor 1 having the above-described configuration is described with reference to FIGS. 2(A) and 2(B). FIG. 2(A) is a graph illustrating a change in the relative rotation speed generated between the spool 2 and the locking base 4 in which a horizontal axis indicates time (sec) and a vertical axis indicates the relative rotation speed (m/s). FIG. 2(B) is a graph illustrating a change in a shaft applied load in which a horizontal axis indicates time (sec) and a vertical axis indicates the shaft applied load (kN). Note that as the load adjustment member 5, the torsion bar 35 illustrated in FIG. 1(B) is used.

An assumption is made when time t=0, the locking base 4 is restrained, and the shaft 3 (torsion bar 35) is in the non-rotating state. When the webbing W is drawn out in this state, a torque (load) is transmitted from the spool 2 to the shaft 3 (torsion bar 35), and as illustrated in FIG. 2(B), the shaft applied load gradually increases. In a case where the shaft applied load is below a threshold $\alpha$, the load adjustment member 5 does not function, whereby the relative rotation speed between the spool 2 and the locking base 4 remains at zero as illustrated in FIG. 2(A). That is, the shaft 3 (torsion bar 35) is in the non-rotating state in a range of 0 to t1 of the time t, whereby drawing out of the webbing W (rotation of the spool 2) is suppressed, and an initial restraining area R is formed.

Then, when the shaft applied load reaches the threshold $\alpha$ at t1 of the time t, the load adjustment member 5 functions, and the relative rotary motion is generated between the spool 2 and the locking base 4, whereby the relative rotation speed gradually increases as illustrated in FIG. 2(A). Due to this relative rotary motion, the energy absorption device 6 functions, and as illustrated in FIG. 2(B), energy of the shaft applied load is absorbed according to a magnitude of the relative rotation speed. That is, an energy absorption amount of the energy absorption device 6 decreases in a case where the relative rotation speed is slow, and the energy absorption amount of the energy absorption device 6 increases as the relative rotation speed becomes faster.

An inclination of the relative rotation speed illustrated in FIG. 2(A) is different depending on a weight and a physical constitution of the occupant. For example, the inclination of the relative rotation speed is small for light-weight occupant while the inclination of the relative rotation speed is large for a heavy occupant. Then, the energy absorption device 6 according to this embodiment is capable of automatically changing the energy absorption amount according to the inclination of the relative rotation speed. That is, an inclination angle $\theta$ of the shaft applied load illustrated in FIG. 2(B) is automatically adjusted.

According to this embodiment described above, until the load equal to or greater than the threshold $\alpha$ is applied to the shaft 3, it is possible to hold such that the spool 2 and the locking base 4 do not rotate relative to each other by the load adjustment member 5. Thus, even at an initial stage of a vehicle crash, it is possible to suppress functioning of the energy absorption device 6 by the load adjustment member 5 and to restrain the occupant to a seat, whereby it is possible to improve a restraining property of the seat belt retractor 1.

In a case where the load equal to or greater than the threshold $\alpha$ is applied to the shaft 3, the load adjustment member 5 functions, and the relative rotary motion is generated between the spool 2 and the locking base 4, whereby the energy absorption device 6 functions. At this time, by using the energy absorption device 6 capable of changing the energy absorption amount according to the relative rotation speed, it is possible to steplessly change energy absorption characteristics as well as to perform appropriate energy absorption according to a difference in the physical constitution among the occupants and the like, whereby it is possible to improve the energy absorption characteristics of the seat belt retractor 1.

Figure 3A:
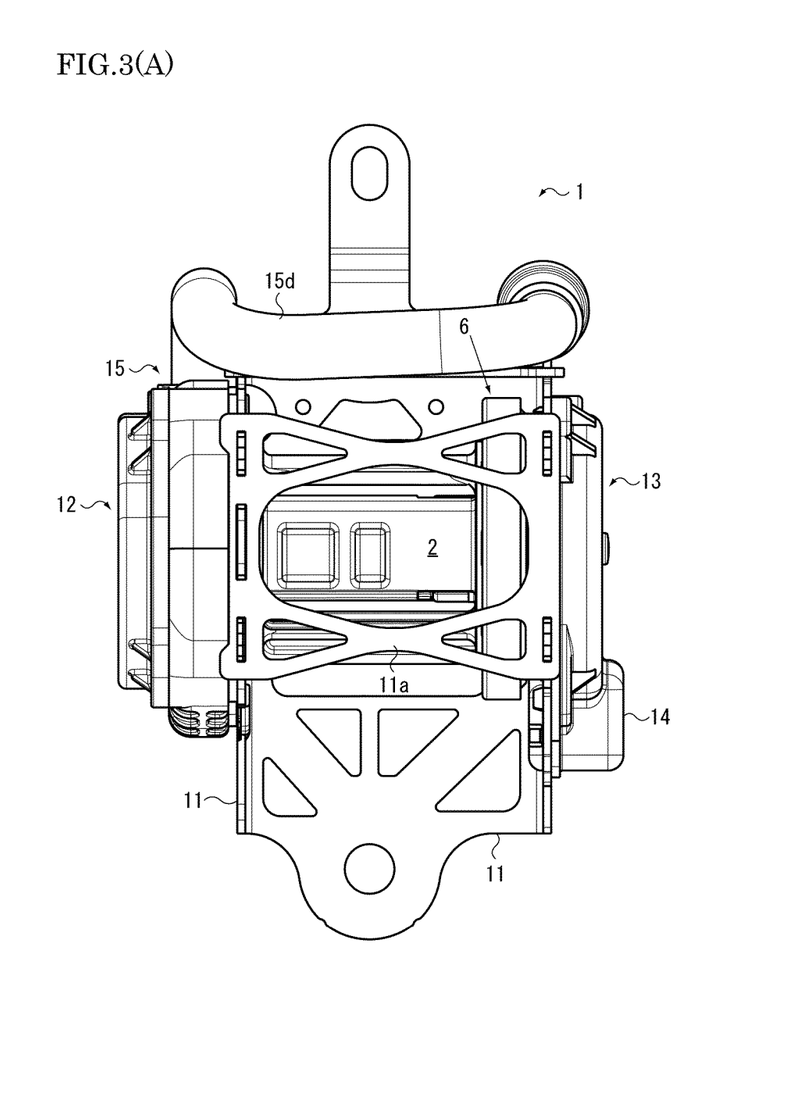
FIGS. 3(A) and 3(B) are views illustrating a seat belt retractor according to a second embodiment of the present invention.
Figure 3B:
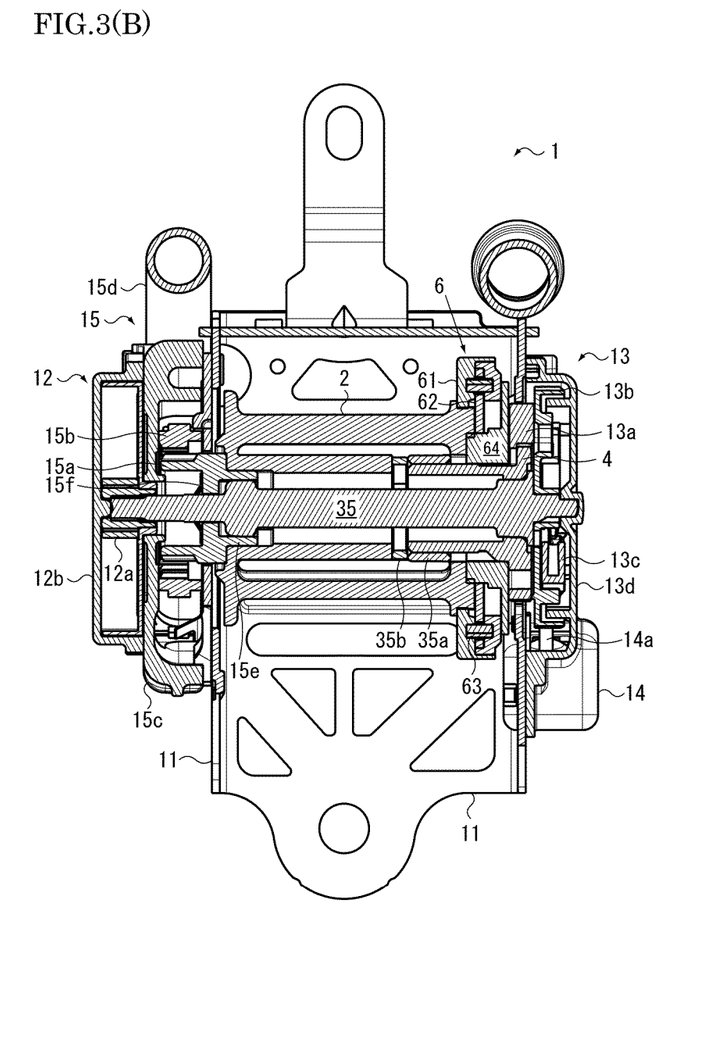
Figure 4:
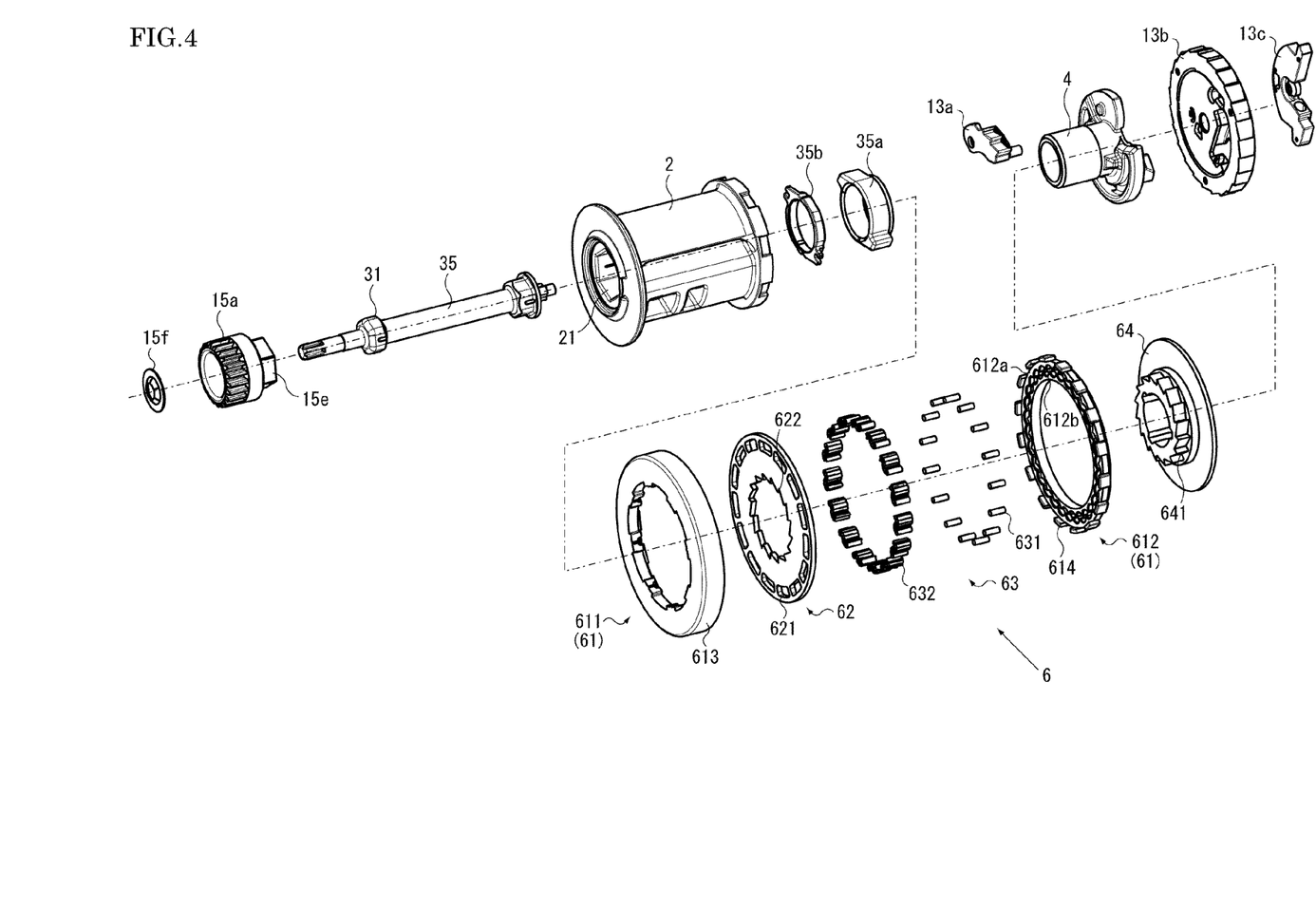
FIG. 4 is an exploded view illustrating components of a shaft unit of the seat belt retractor illustrated in FIG. 3(B).
Figure 5:
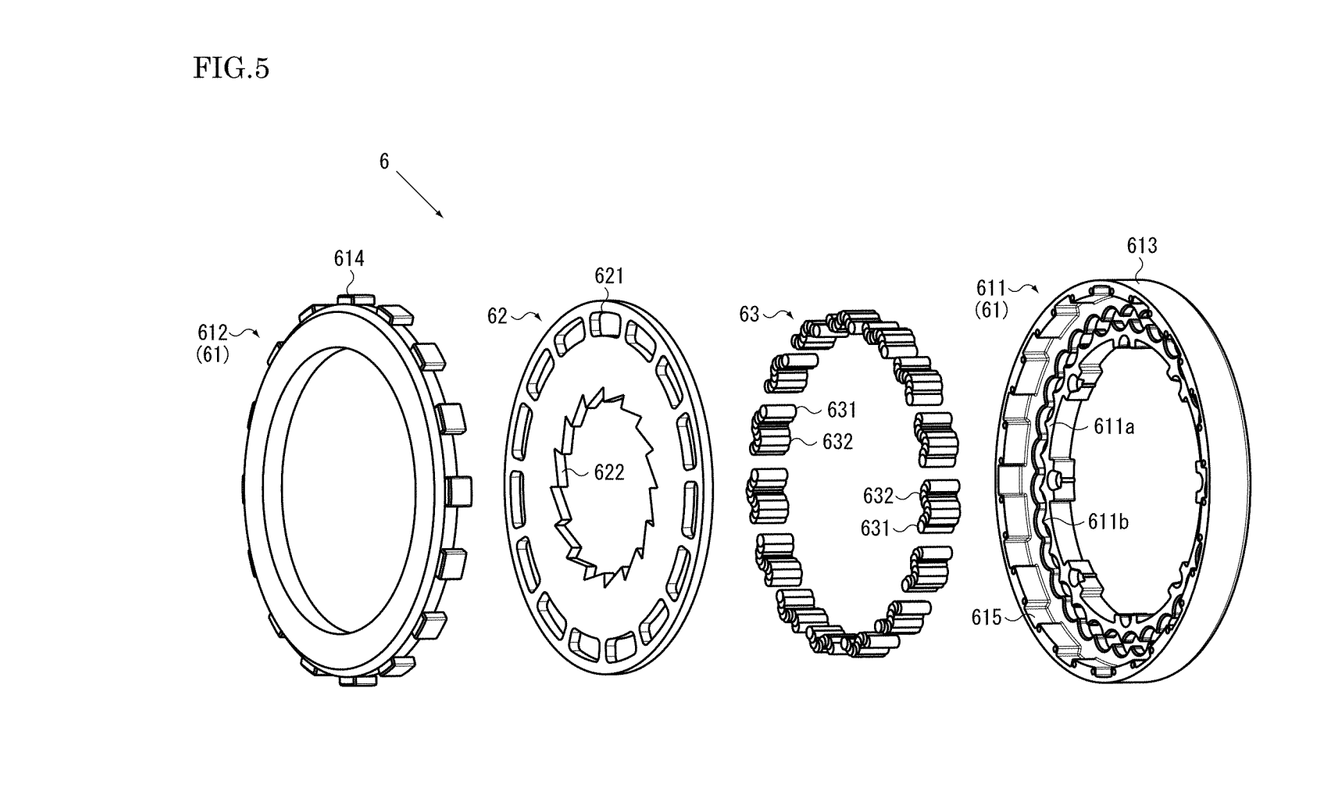
FIG. 5 is an enlarged view of an energy absorption device illustrated in FIG. 4.
Figure 6A:
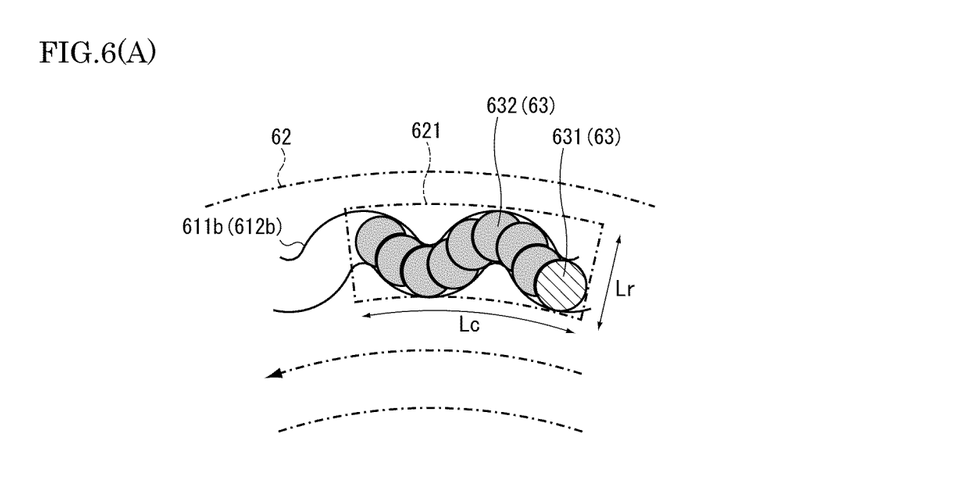
Figure 6B:
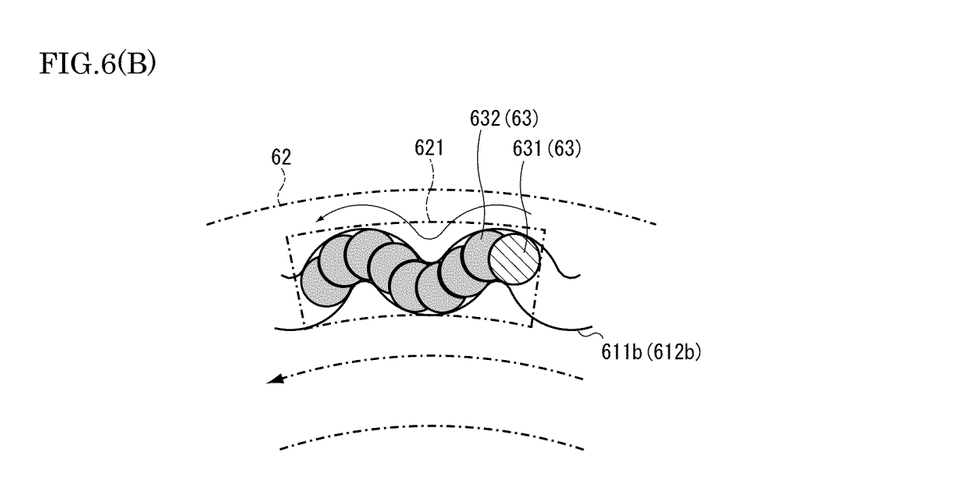

Next, a specific structure of the seat belt retractor 1 according to the above-described embodiment is described with reference to FIGS. 3(A) to 6(B). Here, FIGS. 3(A) and 3(B) are views illustrating a seat belt retractor according to a second embodiment of the present invention; FIG. 3(A) is a front view, and FIG. 3(B) is a sectional view. FIG. 4 is an exploded view illustrating components of a shaft unit of the seat belt retractor illustrated in FIG. 3(B). FIG. 5 is an enlarged view of an energy absorption device illustrated in FIG. 4. FIGS. 6(A) and 6(B) are views illustrating a function of the energy absorption device illustrated in FIG. 5; FIG. 6(A) is the view before relative rotation, and FIG. 6(B) is the view after the relative rotation.

As illustrated in FIG. 3(B), a seat belt retractor 1 according to the second embodiment of the present invention includes a spool 2 that performs winding of a webbing W for restraining an occupant, a shaft 3 inserted through an axial center of the spool 2, and a locking base 4 connected to the shaft 3 and capable of switching between a rotating state and a non-rotating state. The seat belt retractor 1 further includes a load adjustment member 5 disposed between the shaft 3 and the locking base 4 and that blocks or reduces load transmission in a case where a load equal to or greater than a threshold is applied to the shaft 3, and an energy absorption device 6 disposed between the spool 2 and the locking base 4 and capable of changing an energy absorption amount according to a relative rotation speed between the spool 2 and the locking base 4. The energy absorption device 6 is connected in parallel with the load adjustment member 5. The energy absorption device 6 further includes a housing 61 coaxially disposed on a spool 2 side, a clutch plate 62 coaxially disposed on a locking base 4 side, and a drag generation member 63 housed inside the housing 61 and that generates drag according to a relative rotation speed between the housing 61 and the clutch plate 62. Note that in FIGS. 3(A) and 3(B), illustration of the webbing W is omitted for convenience of description.

Similarly with a conventional seat belt reactor, the illustrated seat belt retractor 1 includes a U-shaped base frame 11 having a square section and rotatably housing the spool 2, a spring unit 12 disposed to one end of the torsion bar 35, a lock mechanism 13 disposed to the other end of the torsion bar 35, an acceleration sensor 14 that detects acceleration of a vehicle, and a pretensioner 15 that eliminates a space between the occupant and the webbing W by winding the webbing W up by rotating the spool 2 at the time of a vehicle crash and the like. The base frame 11 may also include a tight plate 11a that couples both side portions. Note that the pretensioner 15 may be omitted as necessary.

As illustrated in FIG. 3(B), the spring unit 12 includes a spring core 12a that forms an axial center of a spiral spring (not illustrated), and a spring cover 12b that houses the spiral spring. The spring core 12a is connected to the one end of the torsion bar 35.

As illustrated in FIGS. 3(B) and 4, the lock mechanism 13 includes the locking base 4 disposed to an end portion of the torsion bar 35, a pawl 13a swingably disposed to the locking base 4, a lock gear 13b disposed to the end portion of the torsion bar 35 so as to be adjacent to an outer side of the locking base 4, a flywheel 13c swingably disposed to the lock gear 13b, and a retainer 13d that houses these components and rotatably supports the torsion bar 35.

As illustrated in FIG. 3(B), the acceleration sensor 14 includes an actuator 14a disposed adjacent to the lock mechanism 13 and that engages with a tooth formed on an outer periphery of the lock gear 13b by detecting acceleration generated to the vehicle due to the vehicle crash and the like.

When the acceleration sensor 14 detects the acceleration generated to the vehicle due to the vehicle crash and the like, rotation of the lock gear 13b is restricted by the actuator 14a. In a case where the webbing W is rapidly drawn out, the flywheel 13c swings by inertia force and engages with a tooth formed on an inner peripheral surface of the retainer 13d, whereby the rotation of the lock gear 13b is restricted. By the rotation of the lock gear 13b being restricted, the pawl 13a swings and projects in an outside diameter direction of the locking base 4, and the pawl 13a engages with a tooth formed in an opening of the base frame 11. Due to this engagement of the pawl 13a, the locking base 4 is fixed (restrained) to the base frame 11.

In a state where the lock mechanism 13 is functioning, in a case where a load is applied in a direction of drawing the webbing W out, since the spool 2 is connected to the locking base 4 though the torsion bar 35, it is held in the non-rotating state until the load equal to or greater than the threshold $\alpha$ is generated to the torsion bar 35. Then, in a case where the load equal to or greater than the threshold $\alpha$ is generated to the torsion bar 35, by the torsion bar 35 being twisted, the spool 2 generates a rotary motion relative to the locking base 4, whereby the webbing W is drawn out.

Note that the torsion bar 35 may include a stopper 35a that specifies the maximum number of torsional rotations. The stopper 35a is inserted into, for example, an outer periphery of a shaft portion of the locking base 4. By such stopper 35a, an amount of drawing out of the webbing W is restricted. It is also possible to dispose a collar 35b for preventing a wobble between the stopper 35a and the spool 2. The torsion bar 35 is integrally formed of the shaft 3 and the load adjustment member 5 according to the above-described first embodiment.

As illustrated in FIGS. 3(A) and 3(B), for example, the pretensioner 15 includes a pinion 15a through which the torsion bar 35 is inserted and coaxially disposed with the torsion bar 35, a ring gear 15b having an internal tooth that is engageable with the pinion 15a, a power generation unit that gives power to the ring gear 15b, and a cover 15c that covers an outer periphery of the ring gear 15b. The power generation unit includes, for example, a mass body (not illustrated) that rotates the ring gear 15b by engaging with the outer periphery thereof, a pipe 15d that emits and houses the mass body, and a gas generator (not illustrated) that gives power to the mass body. During the normal time, the pinion 15a and the ring gear 15b are separated from each other; however, when the mass body is emitted from the pipe 15d at the time of the vehicle crash, the ring gear 15 meshes with the pinion 15a due to moving of the mass body, and the pinion 15a is rotated by rotation of the ring gear 15, whereby the spool 2 is rotated.

As illustrated in FIG. 4, the pinion 15a has a bearing portion 15e extending inward and into which the engagement portion 31 of the torsion bar 35 is fitted. The bearing portion 15e is configured to be inserted through the spool 2 and to be fitted into an opening 21. Thus, one end of the torsion bar 35 is connected to the spool 2 through the bearing portion 15e of the pinion 15a. Note that the pinion 15a is positioned in an axis direction by a push nut 15f.

The configuration of the above-described seat belt retractor 1 is substantially the same as, for example, the configuration of a conventional seat belt retractor according to JP 2012-30636 A and the like, whereby any further description in detail is omitted herein. Then, as illustrated in FIGS. 3(B)

and 4, the seat belt retractor 1 according to this embodiment includes the energy absorption device 6, which is disposed between the spool 2 and the locking base 4.

As illustrated in FIGS. 4 and 5, the energy absorption device 6 is provided with the housing 61, the clutch plate 62, and the drag generation member 63. The housing 61 includes a main body portion 611 that houses the clutch plate 62 and the drag generation member 63, and a cover plate 612 fitted into the housing 61 and that restricts moving of the clutch plate 62 in the rotation axis direction. The main body portion 611 and the cover plate 612 are formed into an annular shape so as to form a space at a central part thereof through which the torsion bar 35 and the like are inserted. Along an outer periphery of the main body portion 611, an outer wall 613 is formed. On an outer periphery of the cover plate 612, a projected portion 614 is formed. To the outer wall 613 of the main body portion 611, an engagement groove 615 is formed at a position corresponding to the projected portion 614. By fitting the projected portion 614 into this engagement groove 615, the cover plate 612 is fixed to the main body portion 611.

The housing 61 includes a pair of facing planes 611a and 612a facing a front surface and a back surface of the clutch plate 62. To the pair of facing planes 611a and 612a, annular corrugated grooves 611b and 612b are formed such that projections and recesses thereof are synchronous with each other. That is, as illustrated in FIG. 5, the facing plane 611a is formed inside the main body portion 611, and as illustrated in FIG. 4, the facing plane 612a is formed inside the cover plate 612. Then, on the facing plane 611a of the main body portion 611, the corrugated groove 611b is formed so as to meander in a circumferential direction, and on the facing plane 612a of the cover plate 612, the corrugated groove 612b is formed so as to meander in the circumferential direction.

The drag generation member 63 includes a plurality of driving pins having both ends thereof inserted into the corrugated grooves 611b and 612b. The clutch plate 62 has a plurality of openings 621 through which the plurality of driving pins is inserted so as to be capable of moving along the corrugated grooves 611b and 612b. As illustrated in FIG. 5, the clutch plate 62 is an annular flat plate member, and the plurality of openings 621 is formed along an outer periphery thereof. To an inner edge portion, an internal tooth 622 for fixing is formed. The drag generation member 63, specifically, includes a cylindrically-shaped first driving pin 631 that abuts on the opening 621 by relative rotation of the clutch plate 62 to the housing 61, and a crescent-pillar-shaped second driving pin 632 that moves by being pushed by the first driving pin 631.

As illustrated in FIG. 6(A), for example, one first driving pin 631 and the plurality of second driving pins 632 are inserted through one opening 621. Note that in FIGS. 6(A) and 6(B), for convenience of description, the clutch plate 62 is illustrated with a long dashed short dashed line. The first driving pin 631 and the second driving pin 632 are disposed along the corrugated grooves 611b and 612b, and when a relative rotary motion is generated between the housing 61 and the clutch plate 62, the driving pins move by meandering along the corrugated grooves 611b and 612b. Thus, each of the openings 621 of the clutch plate 62 is formed such that a length Lr in a radial direction thereof is longer than an interval between apexes of the projections and the recesses of the corrugated grooves 611b and 612b. A length Lc in a circumferential direction of the opening 621 is arbitrary set according to the numbers of the first driving pins 631 and the second driving pins 632 to be inserted therethrough.

Now, in a state illustrated in FIG. 6(A), assuming that the relative rotary motion is generated between the housing 61 and the clutch plate 62, for example, in a direction denoted by an arrow (counterclockwise direction) in FIG. 6(A). Then, assuming that the opening 621 of the clutch plate 62 is moved from a position illustrated in FIG. 6(A) to a position illustrated in FIG. 6(B). At this time, accompanying rotation of the opening 621, the first driving pin 631 is pushed and moved along the corrugated grooves 611b and 612b in a direction of the relative rotation, and accompanying moving of the first driving pin 631, the second driving pin 632 is pushed and moved along the corrugated grooves 611b and 612b in the direction of the relative rotation.

As the relative rotation speed between the housing 61 and the clutch plate 62 increases, accompanying this, a speed of the first driving pin 631 and the second driving pin 632 also increases and kinetic energy of the clutch plate 62 is converted into inertia force of the first driving pin 631 and the second driving pin 632. Since the first driving pin 631 and the second driving pin 632 are pushed against a wall surface when moving within the corrugated grooves 611b and 612b, vertical drag N generated to the first driving pin 631 and the second driving pin 632 increases, and friction force ($F=\mu N$) also increases. That is, it is possible to generate the drag corresponding to the relative rotation speed of the housing 61 and the clutch plate 62 by the drag generation member 63 (the first driving pin 631 and the second driving pin 632).

In the energy absorption device 6 according to the above-described second embodiment, as illustrated in FIG. 3(B), the housing 61 is fixed to the spool 2, and the clutch plate 62 is fixed to the locking base 4 through a fixing ring 64. As illustrated in FIG. 4, the fixing ring 64 has an external tooth 641 that engages with the internal tooth 622 of the clutch plate 62, and the fixing ring 64 is fixed as an opening portion formed at a central part thereof is inserted through the locking base 4. To suppress the fixing ring 64 from rotating, it is preferred that a key and a key way for engagement be formed to a fixing portion with the locking base 4.

Note that such energy absorption device 6 is an example of an energy absorption device capable of changing an energy absorption amount corresponding to the relative rotation speed between the spool 2 and the locking base 4, and a configuration thereof is not to be limited to the illustrated configuration. For example, it is also possible to use an energy absorption device having a configuration described in Patent Literature 2 (JP 2014-502576 A).

According to this embodiment described above, until the load equal to or greater than the threshold α is applied to the torsion bar 35, it is possible to hold such that the spool 2 and the locking base 4 do not rotate relative to each other. Thus, even at the initial stage of the vehicle crash, it is possible to suppress the energy absorption device 6 from functioning by the torsion bar 35 and to restrain the occupant to the seat, whereby it is possible to improve the restraining property of the seat belt retractor 1.

In a case where the load equal to or greater than the threshold α is applied to the torsion bar 35, the torsion bar 35 functions, and the relative rotary motion is generated between the spool 2 and the locking base 4, whereby the energy absorption device 6 functions. At this time, by using the energy absorption device 6 having the above-described configuration, it is possible to steplessly change the energy absorption characteristics as well as to perform appropriate energy absorption according to a difference in the physical constitution among the occupants and the like, whereby it is possible to improve the energy absorption characteristics of the seat belt retractor 1.

Next, a seat belt device 101 provided with the above-described seat belt retractor 1 is described with reference to FIG. 7. Here, FIG. 7 is an overall configuration diagram illustrating a seat belt device according to this embodiment.

Figure 7:
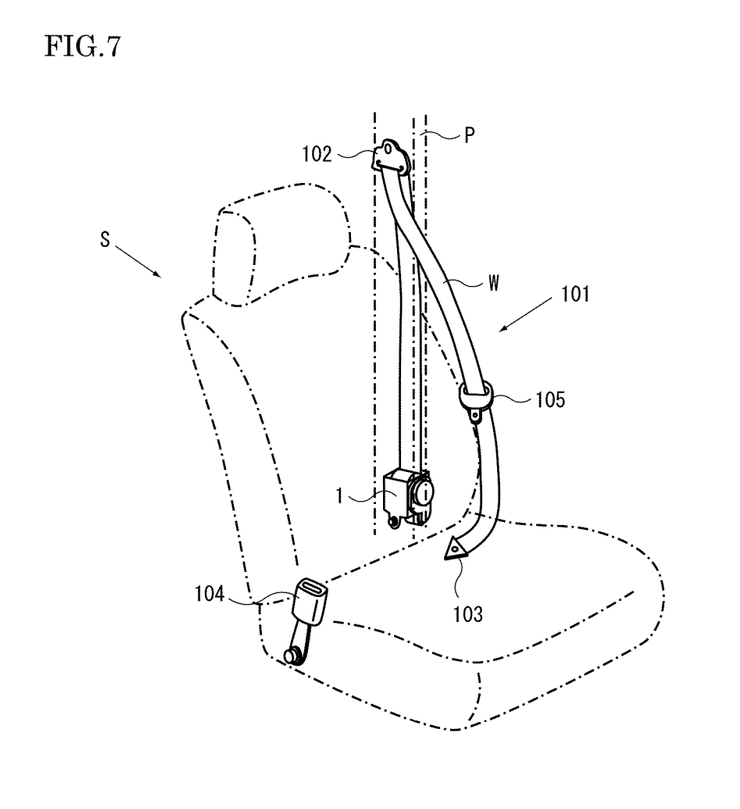
FIG. 7 is an overall configuration diagram illustrating a seat belt device according to the embodiments.

The seat belt device 101 illustrated in FIG. 7 includes a webbing W that restrains the occupant (not illustrated) to a seat S, a seat belt retractor 1 that performs winding of the webbing W, a guide anchor 102 disposed on a vehicle body side and that guides the webbing W, a belt anchor 103 that fixes the webbing W to the vehicle body side, a buckle 104 disposed to a lateral face of the seat S, and a tongue 105 disposed to the webbing W. The seat belt retractor 1 is the seat belt retractor 1 described in either one of the first and second embodiments described above.

The illustrated seat belt device 101 is a seat belt device for a so-called front passenger seat, and in many cases, a pillar P is disposed to a position adjacent to the seat S. Then, for example, the seat belt retractor 1 is disposed within the pillar P, and the guide anchor 102 is disposed on a surface of the pillar P. In such seat belt device 101, by pulling the webbing W out and by fitting the tongue 105 into the buckle 104, it is possible to restrain the occupant to the seat S with the webbing W.

Note that any configuration other than the seat belt retractor 1 of the seat belt device 101 is the same as a conventional seat belt device, whereby a detailed description thereof is omitted herein. The seat belt device 101 is not limited to the one for the front passenger seat; it may also be a seat belt device for a driver's seat or a seat belt device for rear seats. The guide anchor 102 may also be omitted in the seat belt device for the rear seats.

The present invention is not to be limited to the above-described embodiments, and needless to say, various modifications are possible within the scope not deviating from the meaning of the present invention.

The invention claimed is:

1. A seat belt retractor provided with a spool configured to perform winding of a webbing for restraining an occupant, a shaft inserted through an axial center of the spool, and a locking base connected to the shaft and capable of switching between a rotating state and a non-rotating state, the seat belt retractor comprising:
a load adjustment member disposed between the shaft and the locking base and configured to block or reduce load transmission in a case where a load equal to or greater than a threshold is applied to the shaft; and
an energy absorption device disposed between the spool and the locking base and capable of changing an energy absorption amount according to a relative rotation speed between the spool and the locking base, wherein the energy absorption device is connected in parallel with the load adjustment member, and wherein the energy absorption device includes a housing coaxially disposed on a spool side, a clutch plate coaxially disposed on a locking base side, and a drag generation member housed inside the housing and configured to generate drag according to a relative rotation speed between the housing and the clutch plate, and
wherein
the housing has a pair of facing planes facing a front surface and a back surface of the clutch plate, wherein annular corrugated grooves are formed on the pair of facing planes such that projections and recesses thereof are synchronous with each other,
the drag generation member includes a plurality of driving pins having both ends thereof inserted into the corrugated grooves, and
the clutch plate has a plurality of openings through which the plurality of driving pins is inserted so as to be capable of moving along the corrugated grooves.

2. The seat belt retractor according to claim 1, wherein the plurality of driving pins includes a cylindrically-shaped first driving pin configured to abut on the opening by relative rotation of the clutch plate to the housing, and a crescent-pillar-shaped second driving pin configured to move by being pushed by the first driving pin.

3. A seat belt device comprising:
a webbing configured to restrain an occupant to a seat;
a seat belt retractor configured to perform winding of the webbing;
a belt anchor configured to fix the webbing to a vehicle body side;
a buckle disposed to a lateral face of the seat; and
a tongue disposed to the webbing, wherein
the seat belt retractor is the seat belt retractor according to claim 2.

4. The seat belt retractor according to claim 1, wherein the load adjustment member is any of a load limiter, a torque limiter, a torsion bar integrally formed with the shaft, and an energy absorption member.

5. A seat belt device comprising:
a webbing configured to restrain an occupant to a seat;
a seat belt retractor configured to perform winding of the webbing;
a belt anchor configured to fix the webbing to a vehicle body side;
a buckle disposed to a lateral face of the seat; and
a tongue disposed to the webbing, wherein
the seat belt retractor is the seat belt retractor according to claim 1.

* * * * *